United States Patent
Lisi et al.

(10) Patent No.: US 7,285,353 B2
(45) Date of Patent: Oct. 23, 2007

(54) PEM FUEL CELL SEPARATOR PLATE

(75) Inventors: Daniel J Lisi, Eastpointe, MI (US); Richard H Blunk, Macomb, MI (US); Mahmoud M Abd Elhamid, Warren, MI (US); Youssef M Mikhail, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 273 days.

(21) Appl. No.: 10/961,983

(22) Filed: Oct. 8, 2004

(65) Prior Publication Data

US 2005/0048353 A1   Mar. 3, 2005

Related U.S. Application Data

(62) Division of application No. 10/074,913, filed on Feb. 11, 2002, now Pat. No. 6,827,747.

(51) Int. Cl.
*H01M 2/14* (2006.01)
*H01M 4/00* (2006.01)

(52) U.S. Cl. .............................. 429/38; 429/39; 429/42

(58) Field of Classification Search ...................... None
See application file for complete search history.

(56) References Cited

U.S. PATENT DOCUMENTS

| | | | |
|---|---|---|---|
| 4,197,178 A | 4/1980 | Pellegri et al. | |
| 4,510,219 A | 4/1985 | Rowlette | |
| 4,542,082 A | 9/1985 | Rowlette | |
| 4,547,443 A | 10/1985 | Rowlette et al. | |
| 4,625,395 A | 12/1986 | Rowlette | |
| 4,658,499 A | 4/1987 | Rowlette | |
| 5,017,446 A | 5/1991 | Reichman et al. | |
| 5,236,687 A | 8/1993 | Fukuda et al. | |
| 5,567,500 A | 10/1996 | Marshall et al. | |
| 6,096,450 A * | 8/2000 | Walsh ........................ | 429/34 |
| 6,099,984 A | 8/2000 | Rock | |
| 6,103,413 A | 8/2000 | Hinton et al. | |
| 6,248,467 B1 | 6/2001 | Wilson et al. | |
| 6,511,766 B1 | 1/2003 | Loutfy et al. | |
| 6,607,857 B2 | 8/2003 | Blunk et al. | |

OTHER PUBLICATIONS

International Search Report for International Application No. PCT/US03/03035, Filed Feb. 3, 2003.
Electrical conductivity of polyethylene-carbon-fibre composites mixed with carbon black, F.J. Balta Callega, R.K. Bayer, T.A. Ezquerra, Instituto de Estructura de la Materia, CSIC, Serrano 119, 28 006 Madrid, Spain; Jul. 27, 1987; pp. 1411-1415.
Fiber orientation in 3-D injection molded features: prediction and experiment; Brent E. VerWeyst, Charles L. Tucker III, Peter H. Foss, and John F. O'Gara; Jun. 18, 1999; pp. 1-26.

* cited by examiner

*Primary Examiner*—Patrick Joseph Ryan
*Assistant Examiner*—Julian Mercado
(74) *Attorney, Agent, or Firm*—Harness, Dickey & Pierce P.L.C.

(57) ABSTRACT

A composite separator plate for use in a fuel cell stack and method of manufacture is provided. The composite separator plate includes a plurality of elongated support members oriented generally parallel to each other and a polymeric body portion formed around the support members. The body portion includes a first surface with a plurality of flow channels and a second surface opposite the first surface. A plurality of electrically conductive fibers are disposed within the polymeric body portion, each fiber extending continuously from the first surface of the polymeric body portion to the second surface of the polymeric body portion in a through plane configuration.

27 Claims, 10 Drawing Sheets

PEM FUEL CELL SEPARATOR PLATE

CROSS-REFERENCE TO RELATED APPLICATIONS

This application is a divisional of U.S. patent application Ser. No. 10/074,913, filed Feb. 11, 2002, now U.S. Pat. No. 6,827,747. The disclosure of the above application is incorporated herein by reference.

FIELD OF THE INVENTION

The present invention relates to PEM fuel cells, and more particularly to a composite separator plate having conductive fibers extending therethrough to enhance electrical conductivity and a method for manufacturing the same.

BACKGROUND OF THE INVENTION

Fuel cells are being developed as a power source for many applications including vehicular applications. One such fuel cell is the proton exchange membrane or PEM fuel cell. PEM fuel cells are well known in the art and include in each cell thereof a membrane electrode assembly or MEA. The MEA is a thin, proton-conductive, polymeric, membrane-electrolyte having an anode electrode face formed on one side thereof and a cathode electrode face formed on the opposite side thereof. In general, the membrane-electrolyte is made from ion exchange resins, and typically comprise a perfluoronated sulfonic acid polymer such as NAFION™ available from the E. I. DuPont de Nemeours & Co. The anode and cathode faces, on the other hand, typically comprise finely divided carbon particles, very finely divided catalytic particles supported on the internal and external surfaces of the carbon particles, and proton conductive particles such as NAFION™ intermingled with the catalytic and carbon particles; or catalytic particles, without carbon, dispersed throughout a polytetrafluorethylene (PTFE) binder.

The MEA is interdisposed between sheets of porous, gas-permeable, conductive material which press against the anode and cathode faces of the MEA and serve as the primary current collectors for the fuel cell, and the mechanical support for the MEA. Suitable such primary current collector sheets comprise carbon or graphite paper or cloth, fine mesh, noble metal screen, and the like, as is well known in the art. This assembly is referred to as the MEA/primary current collector assembly herein.

The MEA/primary current collector assembly is pressed between a pair of non-porous, electrically conductive separator plates which serve as secondary current collectors for conducting current between adjacent fuel cells internally of the stack (i.e. in the case of bipolar plates) and at the ends of a cell externally of the stack (i.e. in the case of monopolar or end plate). The separator plate contains a flow field that distributes the gaseous reactants (e.g. $H_2$ and $O_2$/air) over the surfaces of the anode and the cathode. These flow fields generally include a plurality of lands which contact the primary current collector and define therebetween a plurality of flow channels through which the gaseous reactants flow between a supply header and an exhaust header located at opposite ends of the flow channels.

Conventionally, a separator plate is formed of a suitable metal alloy such as stainless steel or aluminum protected with a corrosion resistant, conductive coating for enhancing the transfer of thermal and electrical energy. Such metal plates require two stamping or etching processes to form the flow fields and either a bonding or brazing process to fabricate a cooled plate assembly which adds cost and complexity to the design. In addition, the durability of the metal plate in the corrosive fuel cell environment and the possibility of coolant leakage remains a concern.

These drawbacks have led to the development of composite separator plates. In this regard, recent efforts in development of a composite separator plate have been directed to materials having adequate electrical and thermal conductivity. Material suppliers have developed high carbon loading composite plates consisting of graphite powder in the range of 70% to 90% by volume in a polymer matrix to achieve the requisite conductivity targets. Separator plates of this type survive the corrosive fuel cell environment and, for the most part, meet cost and conductivity targets. However, due to the high graphite loading and the high specific gravity of graphite, these plates are inherently brittle and dense which yield less than desirable volumetric and gravimetric stack power densities.

Additionally, efforts have been made to reduce the fuel cell stack mass and volume by using thinner plates. Unfortunately, the brittle nature of these plates frequently results in cracking and breaking, especially in the manifold sections of the plate, during part demolding, during adhesive bonding, and during stack assembly operations. As such, a separator plate having a relatively low carbon concentration and relatively high-polymer concentration is desirable to reduce the brittleness of the separator plate and to meet fuel cell stack mass and volume targets. Unfortunately, at low carbon concentrations, it is extremely difficult to meet the desired electrical and thermal conductivity targets.

Fibrous materials are typically ten to one thousand times more conductive in the axial direction as compared to conductive powders. Consequently, a polymeric separator plate having a conductive fibrous material disposed therein would increase the electrical conductivity of the plate without having a relatively high concentration of carbon loading which may lead to brittleness. However, to achieve these benefits, the fibrous materials must be properly oriented in a through plane direction. Furthermore, a polymeric separator plate having a conductive fibrous members extending continuously therethrough in a through plane orientation would greatly enhance the transfer of electrical energy through the separator plate.

Thus, there is a need to provide a fuel cell separator plate and a method of manufacture which overcomes the inherent problems associated with high carbon loaded plates and the difficulties associated therewith. Therefore, it is desirable to provide a fuel cell separator plate formed of a robust material having a conductive fibrous material extending therethrough to enhance the electrical conductivity of the separator plate. It is also desirable to provide a fuel cell separator plate having integrally formed cooling channels to reduce the thermal energy in the plate and the possibility of coolant leaks in the separator plates. It is further desirable to provide a method of manufacturing such fuel cell separator plates which reduces the number of steps in fabricating cooled plates (i.e. eliminate double forming and bonding).

SUMMARY OF THE INVENTION

The present invention provides a composite separator plate for use in a fuel cell stack. The composite separator plate includes a plurality of elongated support members oriented generally parallel to each other and a polymeric body portion formed around the support members. The body portion has a first surface with a plurality of flow channels and a second surface opposite the first surface. A plurality of electrically conductive fibers are disposed within the polymeric body portion, each fiber extending continuously from the first surface of the polymeric body portion to the second surface of the polymeric body portion in a through plane configuration.

The present invention also provide a method of manufacturing a composite separator plate wherein a plurality of elongated support members are oriented in a generally parallel arrangement. A plurality of conductive continuous fibers are arranged adjacent the plurality of support members to form a lattice. The lattice is encased in a polymeric material to form a non-porous separator plate having a first and second surface. A plurality of channels are formed in at least one of these surfaces. A portion of the first and second surfaces are removed to form exposed surfaces and to sever the continuous fibers into a plurality of conductive elements having ends which terminate at the exposed surfaces. Each of the plurality of conductive elements extend continuously in a through plane direction through the separator plate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments are merely exemplary in nature and are in no way intended to limit the invention, its application, or uses.

Figure 1:
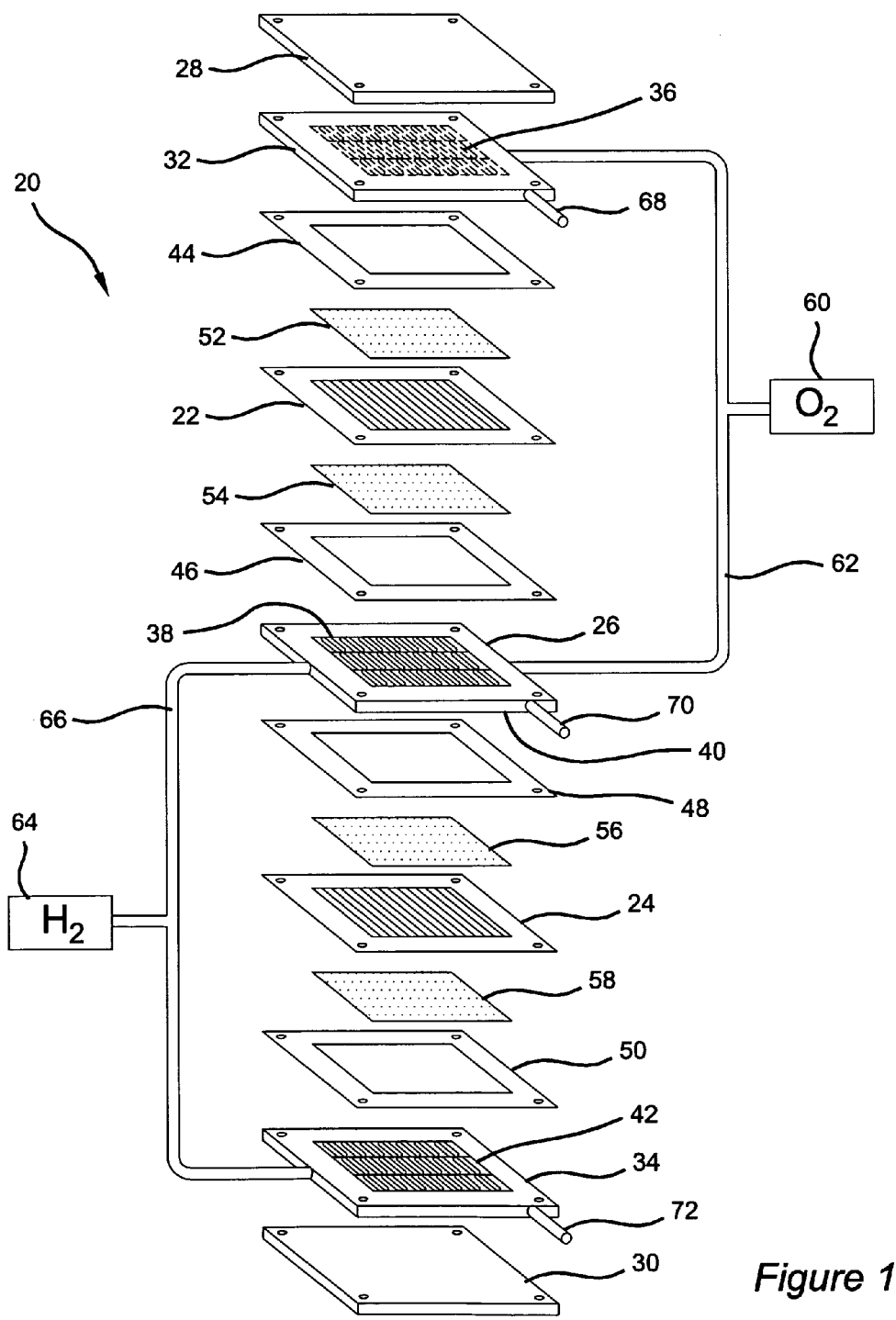
FIG. 1 is a schematic exploded illustration of a PEM fuel stack.

With reference to FIG. 1 a partial PEM fuel cell stack 20 is schematically illustrated having a pair of membrane electrode assemblies (MEAs) 22, 24 separated from each other by a non-porous, electrically-conductive bipolar separator plate 26. MEAs 22, 24 and separator plate 26 are stacked together between clamping plates 28, 30 and monopolar separator plates or end plates 32, 34. Separator plates 26, 32 and 34 each have a plurality of channels 36, 38, 40, 42 formed in the faces of the plates which define flow fields for distributing reactants (i.e. $H_2$ and $O_2$) to the anode and cathode faces of MEAs 22, 24. Nonconductive gaskets or seals 44, 46, 48, 50 seal and electrically insulate plates 26, 32, 34 of the fuel cell stack 20. Primary current collectors 52, 54, 56, 58 are formed of porous, gas permeable, electrically-conductive material which press up against the reactive faces of the MEAs 22, 24. Primary current collectors 52-58 also provide mechanical supports for MEAs 22, 24 particularly at locations where the MEAs 22, 24 are otherwise unsupported along the flow channels 36-42 in the flow field. Suitable primary current collectors include carbon/graphite paper/cloth, fine mesh screens, open cell noble metal forms, and the like which conduct current from the MEAs 22, 24 while allowing the reactant gas to pass therethrough.

Separator plates 32, 34 press up against the primary current collectors 52, 58 respectively, while separator plate 26 presses up against primary current collector 54 on the anode face of MEA 22 and against primary current collector 56 on the cathode face of MEA 24. Oxygen is supplied to the cathode side of the fuel cell stack from a storage tank 60 via appropriate supply plumbing 62, while hydrogen is supplied to the anode side of the fuel cell stack from a storage tank 64 via appropriate supply plumbing 66. The $O_2$ storage tank 60 may be eliminated and air supplied to the cathode side from the ambient; and the $H_2$ storage tank 64 may be eliminated and hydrogen supplied to the anode from a reforming system which reforms hydrogen from methanol or a liquid hydrocarbon such as gasoline. Exhaust plumbing (not shown) for both the $H_2$ and the $O_2$/air sides of the MEAs 22, 24 is also provided for removing anode and cathode effluent from their respective flow fields. Additional plumbing 68, 70, 72 is provided for circulating a cooling fluid through plates 26, 32, 34 as may be needed.

Figure 2:
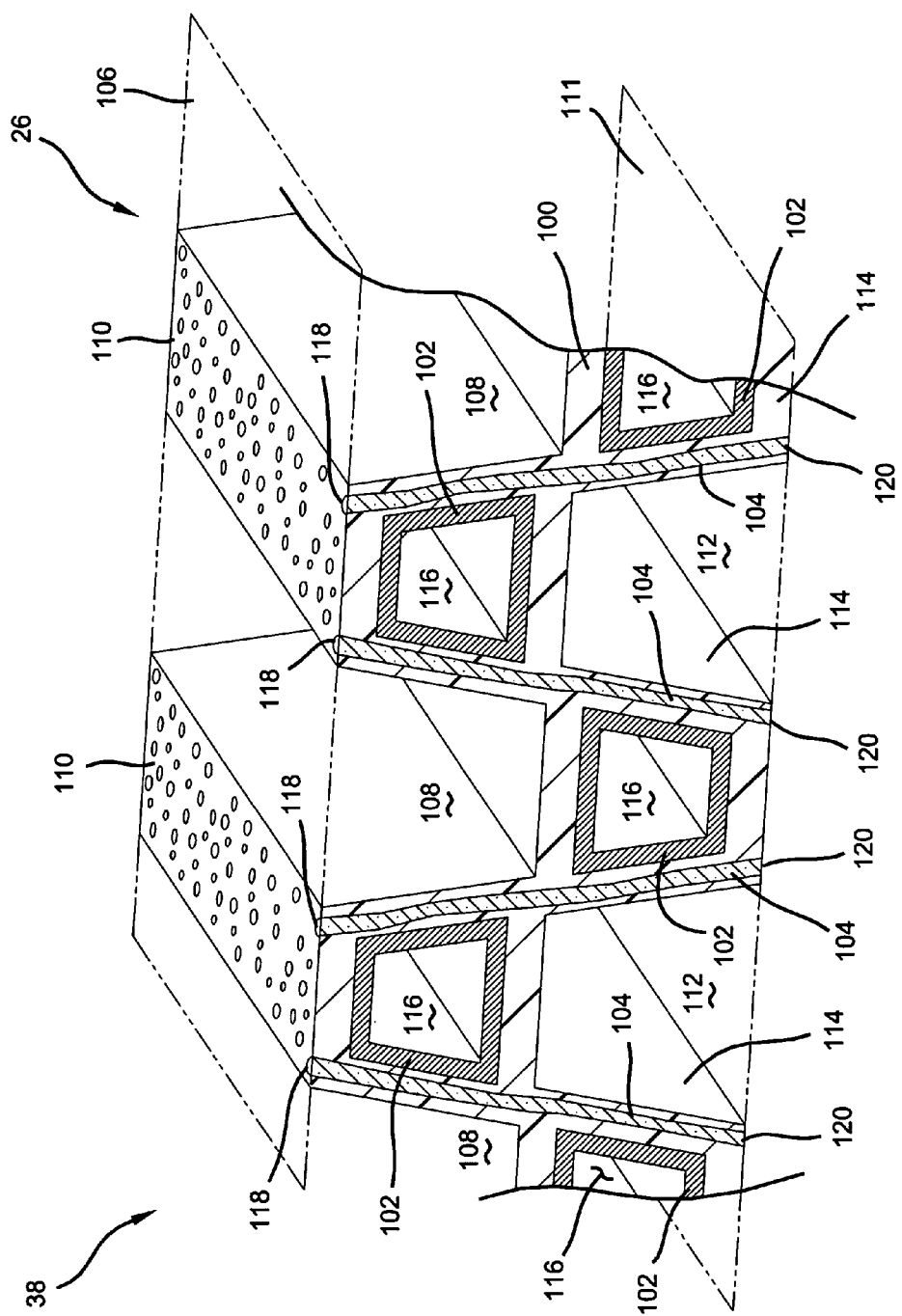
FIG. 2 is a partial cross-sectional view of a first embodiment of a bipolar plate constructed in accordance with the present invention.

FIG. 2 shows the flow field portion 38, 40 of bipolar separator plate 26 constructed in accordance with the teachings of the present invention. The bipolar separator plate 26 includes a main body portion 100 defining the exemplary shape of the separator plate 26, a plurality of tubular members 102 disposed within the main body portion 100 and a plurality of electrically conductive elements 104 extending through the main body portion 100 in a through-plane orientation. In operation, the separator plate 26 is in electrical contact with the MEAs 22, 24 via current collectors 54, 56 and in thermal contact with the gaseous reactants flowing through channels 38, 40. The conductive fibers 104 and tubular members 102 of the separator plate 26 enhance the transfer of electrical and thermal energy, respectively, to control the environment of the fuel cell stack.

The main body portion 100 is formed to have flow field 38 formed in an upper surface 106 of the separator plate. The flow field 38 is defined by a plurality of channels 108 and a plurality of lands 110 that are in contact with the primary current collector 54. The flow field 38 provides a pathway for the gaseous reactants in the fuel cell stack to travel from an intake manifold (not shown) to an exhaust manifold (not shown). Similarly, flow field 40 is formed on a lower surface 111 of the separator plate 26. The flow field 40 is defined by a plurality of channels 112 and a plurality of lands 114 that are in contact with the primary current collector 56 of the fuel cell stack. The channels 108, 112 and lands 110, 114 may be constructed to have a variety of geometries. The shape of the lands defines the size, shape and configuration of the flow fields 38, 40, which may be altered to achieve desired flow of the gaseous reactants. As presently illustrated, the flow fields are configured as having parallel channels and lands.

The main body portion 100 is formed of a polymeric material having relatively high strength, suitable thermal properties and low permeation with respect to coolant fluid and reactant gases. Preferably, the main body portion 100 is formed of a toughened, thermally conductive polymer such as carbon-filled epoxy. However, the main body portion 100 may be formed of other suitable materials having such desirable properties. For example, the main body portion may be constructed of silicone, poly-isobutylene, polyvinyl ester, polyester, phenolic, polypropylene, ETFE, nylon or rubber-modified polypropylene. The thermal conductivity can be enhanced by loading the polymeric material with carbon, graphite or nobel metal particles.

The tubular members 102 disposed within the main body portion 100 of the separator plate 26 are operable to define a secondary flow field there-through to pass a cooling fluid through the separator plate 26 for controlling the thermal energy thereof. The tubular members 102 are adapted to pass a cooling fluid through plumbing 70 to remove (or add) thermal energy from (to) the fuel cell stack 20. The coolant headers which fluidly couple the tubular member 102 to the plumbing 70 should provide electrically insulation therebetween to eliminate shunt current between the fibers 104 and the tubular members 102.

Typically, the exothermic reaction of the gaseous reactants in a fuel cell stack 20 creates unwanted thermal energy that should be removed. The tubular members 102 define a passageway 116 extending through the tubular member 102. As shown in FIG. 2, the tubular members 102 are formed to be complementary in shape, to the lands 110, 114 of the separator plate 26. Thus, while tubular members 102 are illustrated as having a generally trapezoidal cross-section, a skilled practitioner will recognize that the tubular member 102 may be formed to have a variety of cross sectional shapes. In this regard, it is preferred that the tubular members 102 comprise at least one-half of the cross sectional area of the lands and more preferably about 80% of the cross sectional area of the lands to maximize thermal conductivity.

As presently preferred, the tubular members 102 are formed of a carbon-filled polymer. However, it is contemplated that the tubular members 102 may be formed of any of a variety of materials that are thermally conductive and not susceptible to corrosion from exposure to the gaseous reactant or coolants commonly used in a fuel cell stack. Some other suitable materials include titanium, carbon or stainless steel.

The ability to conduct thermal energy from the separator plate 26 to the tubular member 102 is generally increased as the contact area between the body portion 100 and the outer surface of the tubular member 102 is increased. It should also be appreciated that the size and shape of the tubular member 102 may affect the thermal conductivity between the main body portion 100 and the tubular members 102. For example, the trapezoidal shape of the tubular members 102 shown in FIG. 2 is believed to optimize thermal conductivity therebetween.

The conductive elements 104 disposed within the separator plate 26 are generally oriented in a through plane orientation and extend continuously from the upper surface 106 of the separator plate 26 to the lower surface 112 of the separator plate 26 for minimizing the bulk resistivity of the plate 26. Each conductive element 104 is an elongated fiber (i.e. an aspect ratio of 2000:1 or greater). The first end 118 is exposed at the upper surface 106 and directly contacts the primary current collector 54. The second end 120 is exposed at the lower surface 111 and directly contacts primary current collector 56. The conductive elements 104 are formed of a carbon-based, electrically conductive fiber such as pitch-based fibers, PAN-based fiber, or others. The conductive elements 104 may also be formed of other suitable electrically conductive fibrous materials such as graphite fibers, Au-coated graphite fibers, Pt.-coated graphite fibers, Au fibers, Pt. fibers or stainless steel fibers.

The composite separator plate 26 is formed using a process such that the conductive elements 104 are disposed within the body portion 102, each fiber extending continuously from the upper surface 106 to the lower surface 112 of the plate in a through-plane orientation. As presently preferred, the separator plate 26 is formed of a composite material having a composition of a polymeric material of 50% to 98% by volume % and a plurality of conductive elements of 2% to 50% by volume %. As more preferred, the separator plate 26 includes at least 80% polymeric material and approximately 10% conductive elements, the balance being a thermally conductive material dispersed within the polymeric material. The preferred separator plate has a bulk resistivity equal to or less than 0.01 ohm·cm ($\Omega$·cm) and an area specific resistance equal to or less than 50 milliohms·centimeters squared (m$\Omega$·cm$^2$) at a compression ratio of less than or equal to approximately 14 kilogram force per centimeters squared (Kgf/cm$^2$). In this regard, the area specific resistance includes the contact resistance and the bulk resistance of the separator plate.

Figure 3:
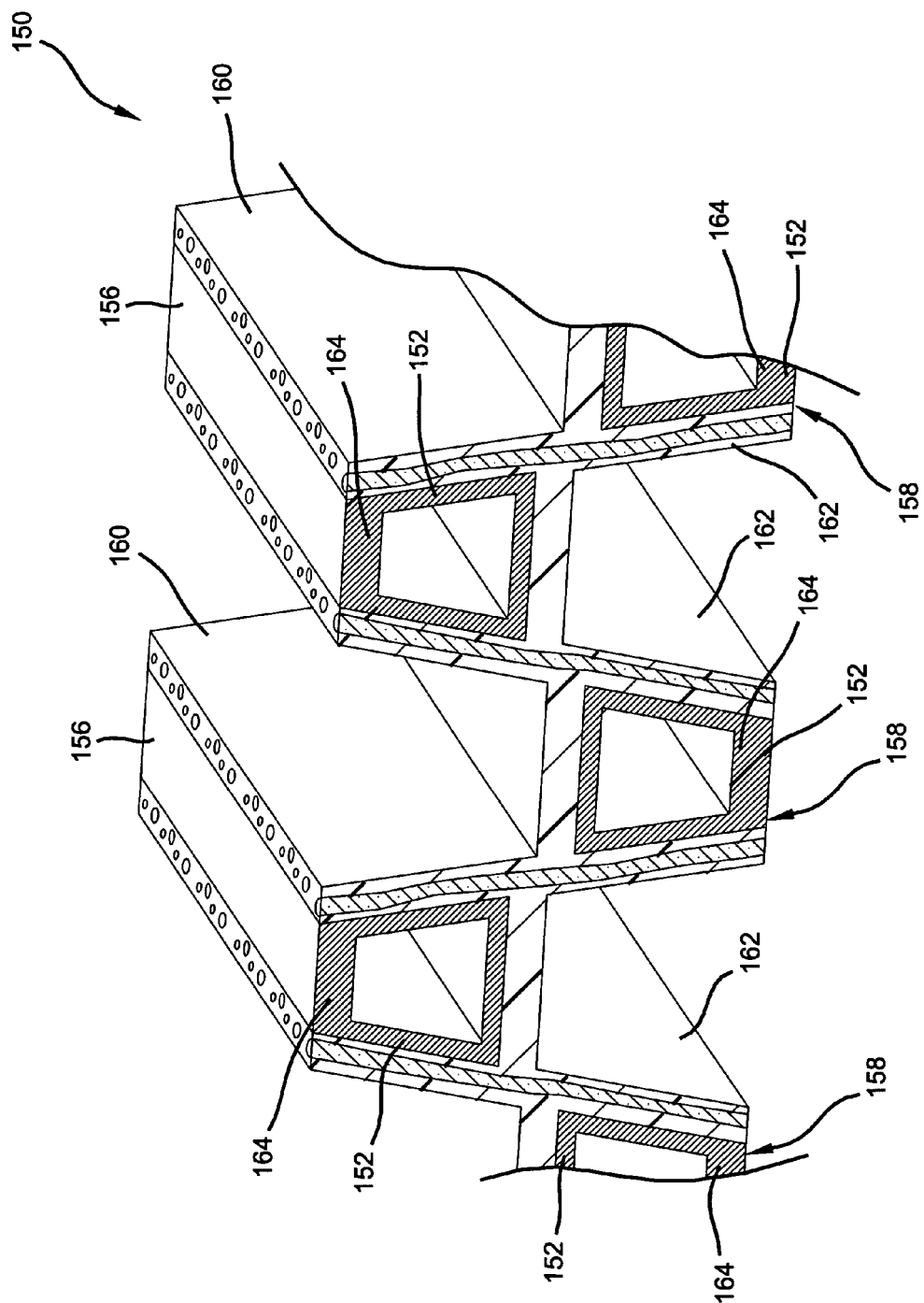
FIG. 3 is a partial cross-sectional view of a second embodiment of a bipolar plate construction in accordance with the present invention.

FIG. 3 shows a second preferred embodiment of a separator plate 150 formed in accordance with the present invention. The separator plate 150 is substantially similar to the separator plate 26 described above, except for the following features which will be discussed in detail. The tubular members 152 of the separator plate 150 are in thermal contact with the planar surfaces 156, 158 of lands 160, 162. An extended conductive portion 164 extends from the tubular member 152 and terminates at the planar surfaces 156, 158. The extended conductive portion 164 engages the primary current collector 54. In operation, the extended conductive portion 164 transfers thermal energy from the interface of the primary current collector 54 and the separator plate 150 directly to the tubular member 152 and the coolant fluid therein. The extended conductive portion 164 is preferably integrally formed with the tubular member 152. However, it is contemplated that the extended conductive portion 164 may be formed separately or of another conductive material for enhancing thermal energy transfer to the tubular member 152.

Figure 4:
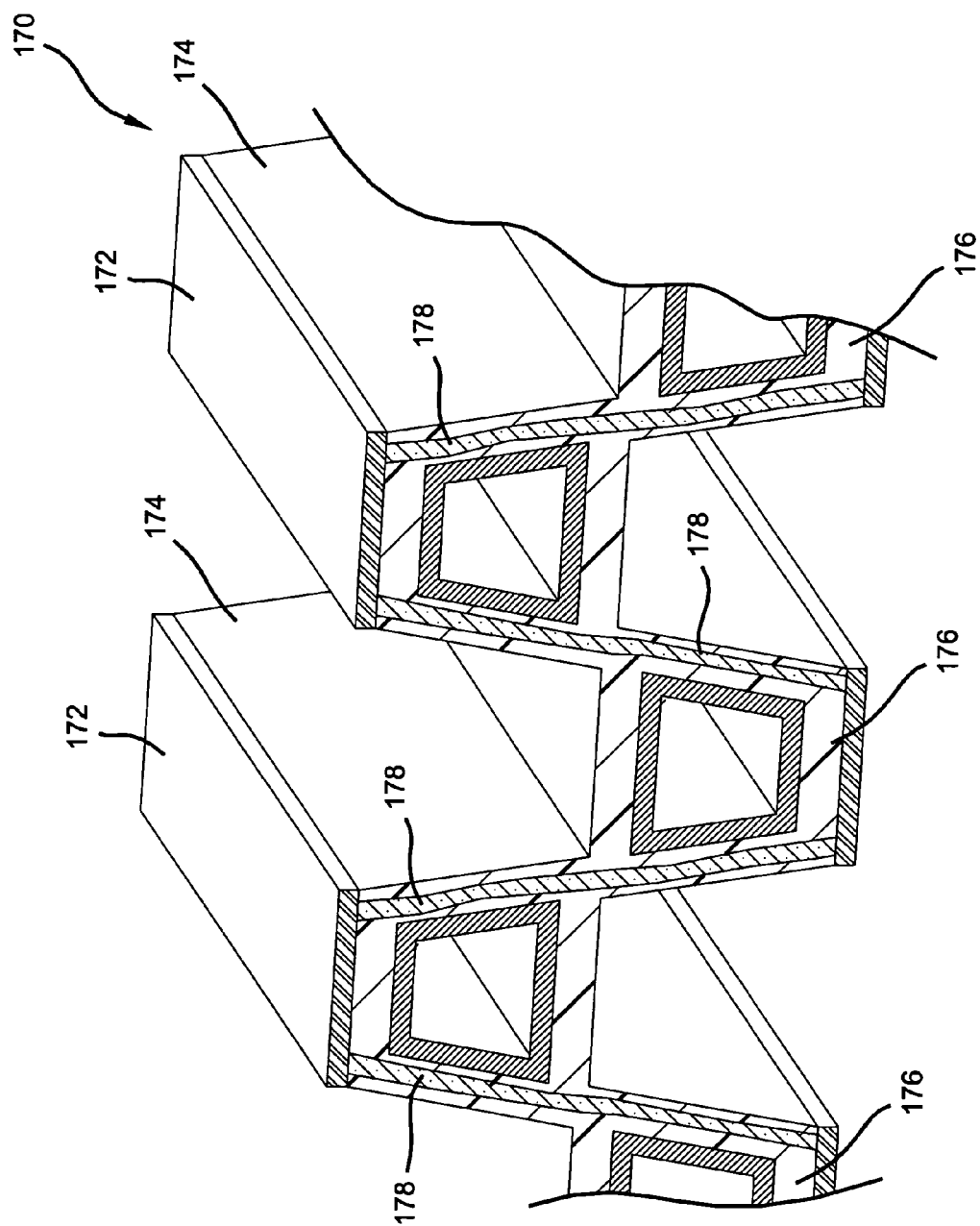
FIG. 4 is a partial cross-sectional view of a third embodiment of a bipolar plate constructed in accordance with the present invention.

A third preferred embodiment of a separator plate 170 constructed in accordance with the teachings of the present invention is shown in FIG. 4. The separator plate 170 is substantially similar to the separator plate 26 described above except for the following differences which will be discussed in detail. The separator plate 170 is formed to have a highly conductive layer 172 disposed over the planar surfaces of the lands 174, 176. The highly conductive layer 172 is formed to cover the exposed faces of lands 174, 176 and to conductively contact the end portions of the conductive fibers 178. The highly conductive layer 172 is operable to conduct electrical energy from the primary current collectors 54, 56 to the conductive fibers 178 of the separator plate 170. Further details concerning the highly conductive layer are disclosed in U.S. application Ser. No. 09/997,190 entitled "Low Contact Resistance PEM Fuel Cell" filed Nov. 20, 2001, which is commonly owned by the assignee of the present invention and the disclosure of which is expressly incorporated by reference.

Figure 5:
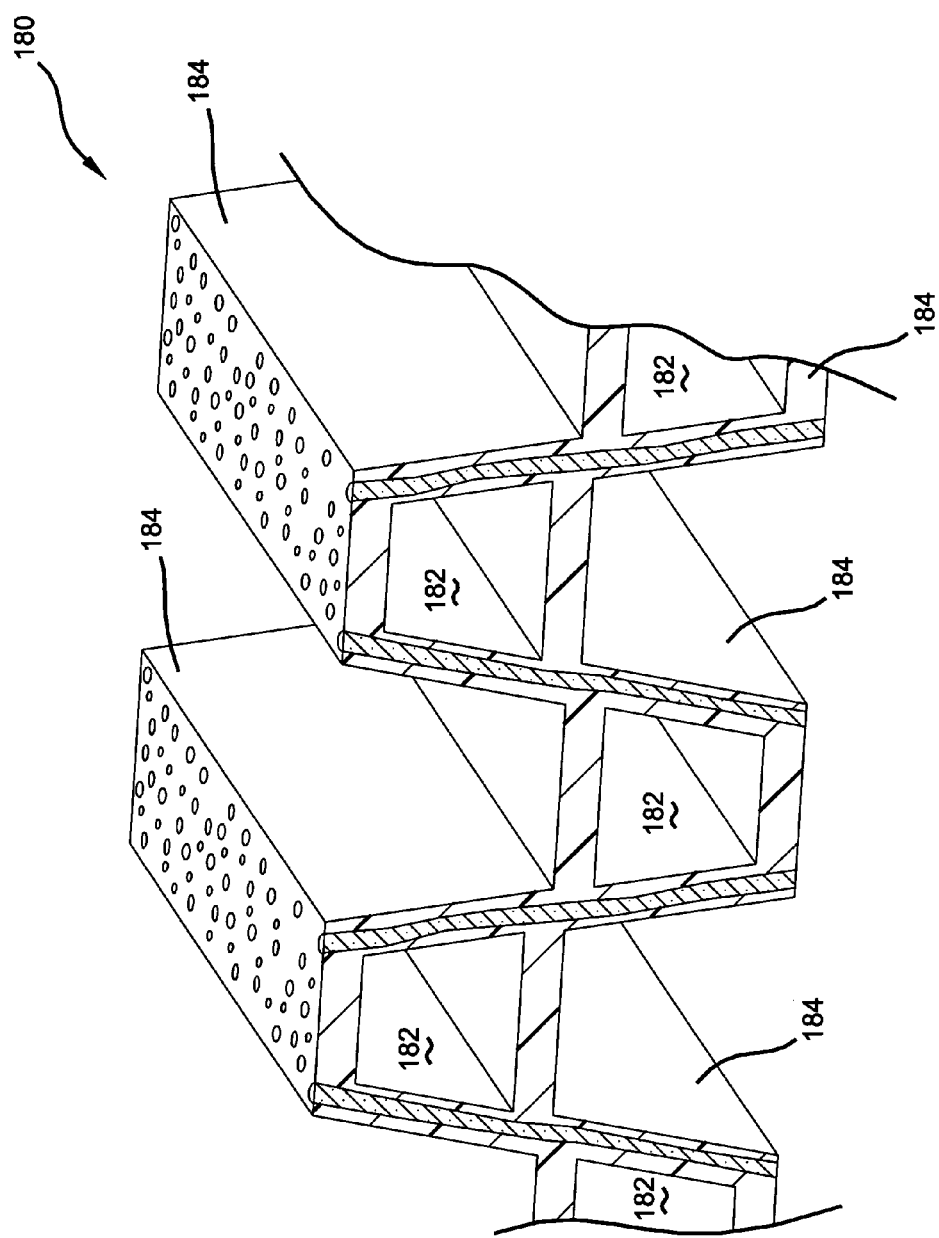
FIG. 5 is a partial cross-sectional view of a fourth embodiment of a bipolar plate constructed in accordance with the present invention.

A fourth preferred embodiment of a separator plate 180 constructed in accordance with the teachings of the present invention is shown in FIG. 5. The separator plate 180 is substantially similar to the separator plate 26 except for a few differences which will be discussed in detail. The separator plate 180 includes a hollow passageway 182 formed in the lands 184 of the separator plate 180. In this regard, the tubular members 102 of separator plates 26 are eliminated. The conductive fibers 186 extend through the main body portion 188 of the separator plate 180. The passageways 182 are coupled to a fluid coolant system (not shown) for controlling the thermal energy in the separator plate 180 in a manner previously described with respect to tubular members 102.

Figure 6:
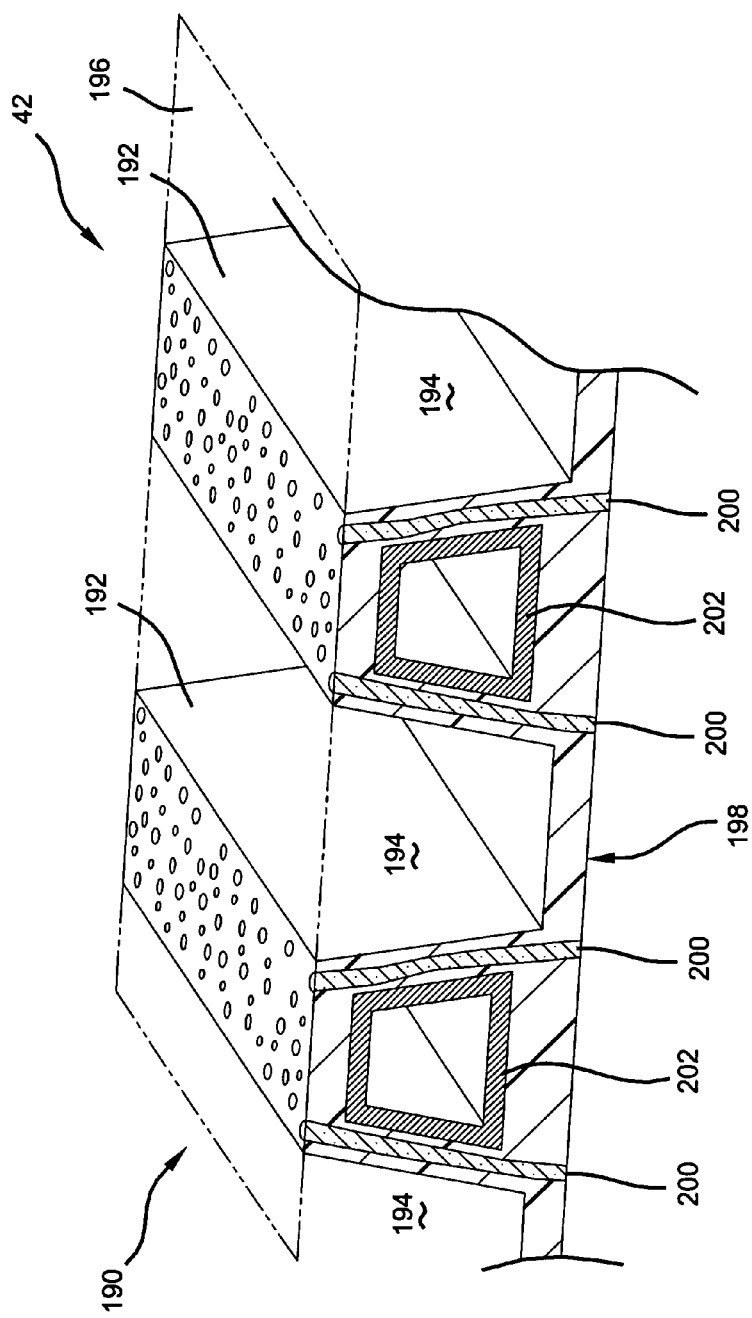
FIG. 6 is a partial cross-sectional view of a monopolar separator plate constructed in accordance with the present invention.

The composite separator plates 26, 150, 170, 180 described above have been of the bipolar type. However, the teachings of the present invention are equally applicable to a monopolar type separator plate 190 as shown in FIG. 6. The monopolar separator plate 190 include a flow field 42 defined by lands 192 and channels 194 in the upper surface 196 of the separator plate 190. A generally planar lower surface 198 is formed opposite the upper surface 196 and engages the end plate 12, 14. The conductive fibers 200 extend from upper surface 196 of the lands 192 extend through the separator plate 190 and terminate at the lower surface 198 of the separator plate 190 to enhance electrical and thermal conductivity through the separator plate 190. Likewise, tubular members 202 extend through separator plate 190 to provide internal cooling passageways.

Another aspect of the present invention is to provide a method of manufacturing a separator plate having continuous conductive fibers aligned in a through plane orientation to enhance the electrical and thermal conductivity of the separator plate. The method of manufacturing the aforementioned separator plate enables the use of integrally formed coolant passageways to enhance the thermal capacity of the separator plate.

Figure 7:
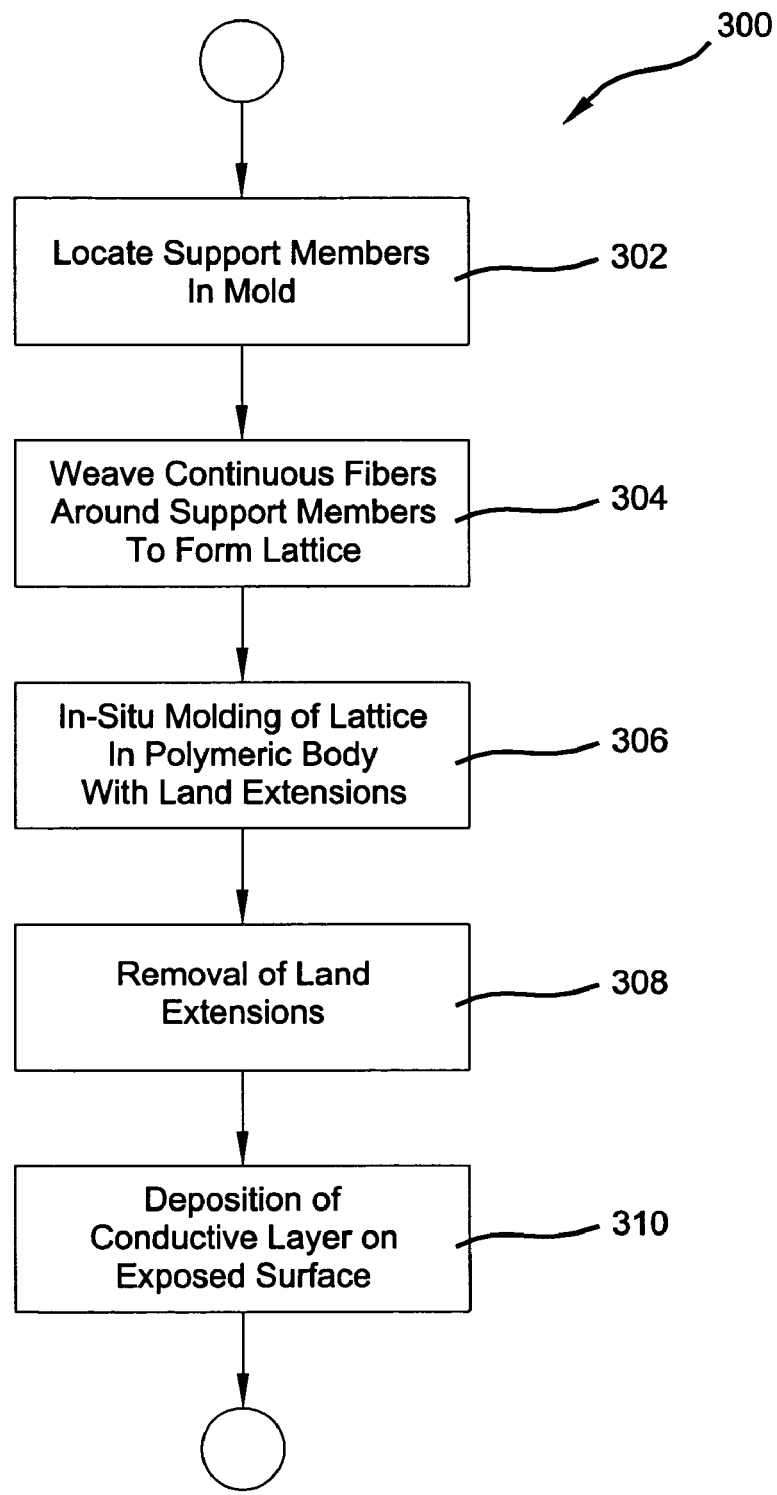
FIG. 7 is a flow chart identifying the preferred manufacturing process of the present invention.
Figure 8:
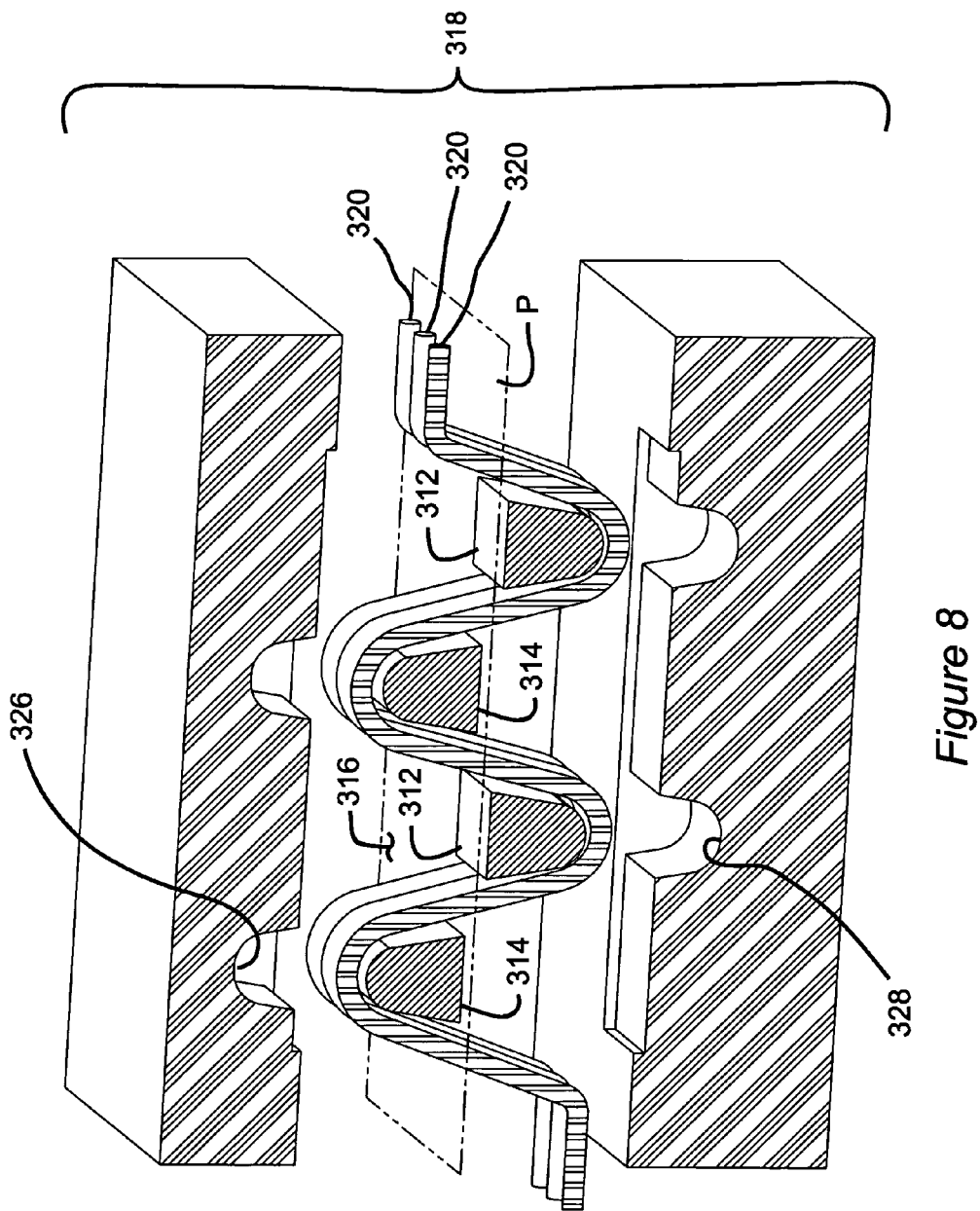
FIG. 8 is a schematic illustration of a portion of a composite separator plate at block 304 of FIG. 7 of the manufacturing process.
Figure 9:
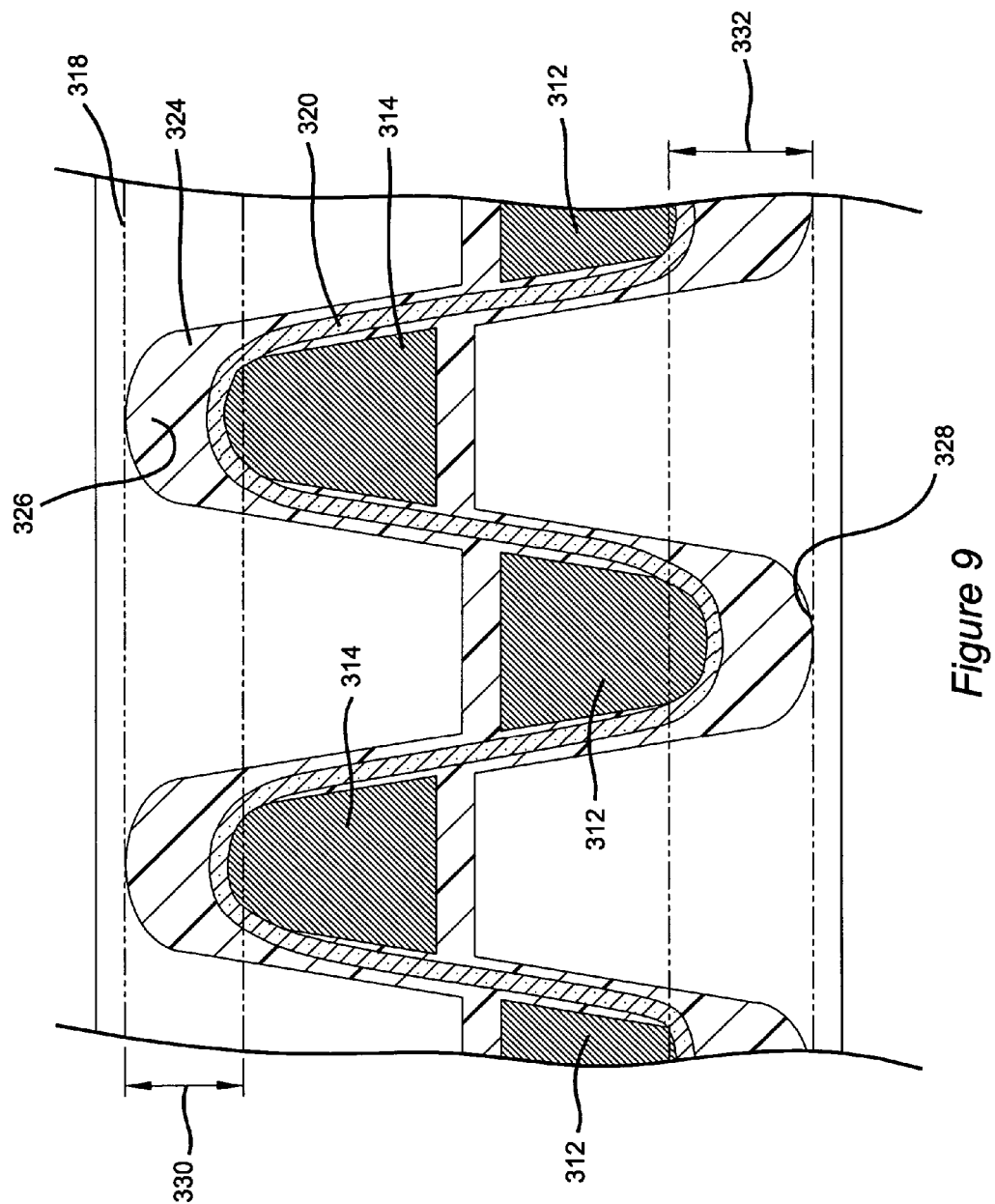
FIG. 9 is a schematic illustration of a portion of a composite separator plate at block 306 of FIG. 7 of the preferred manufacturing preferred.
Figure 10:
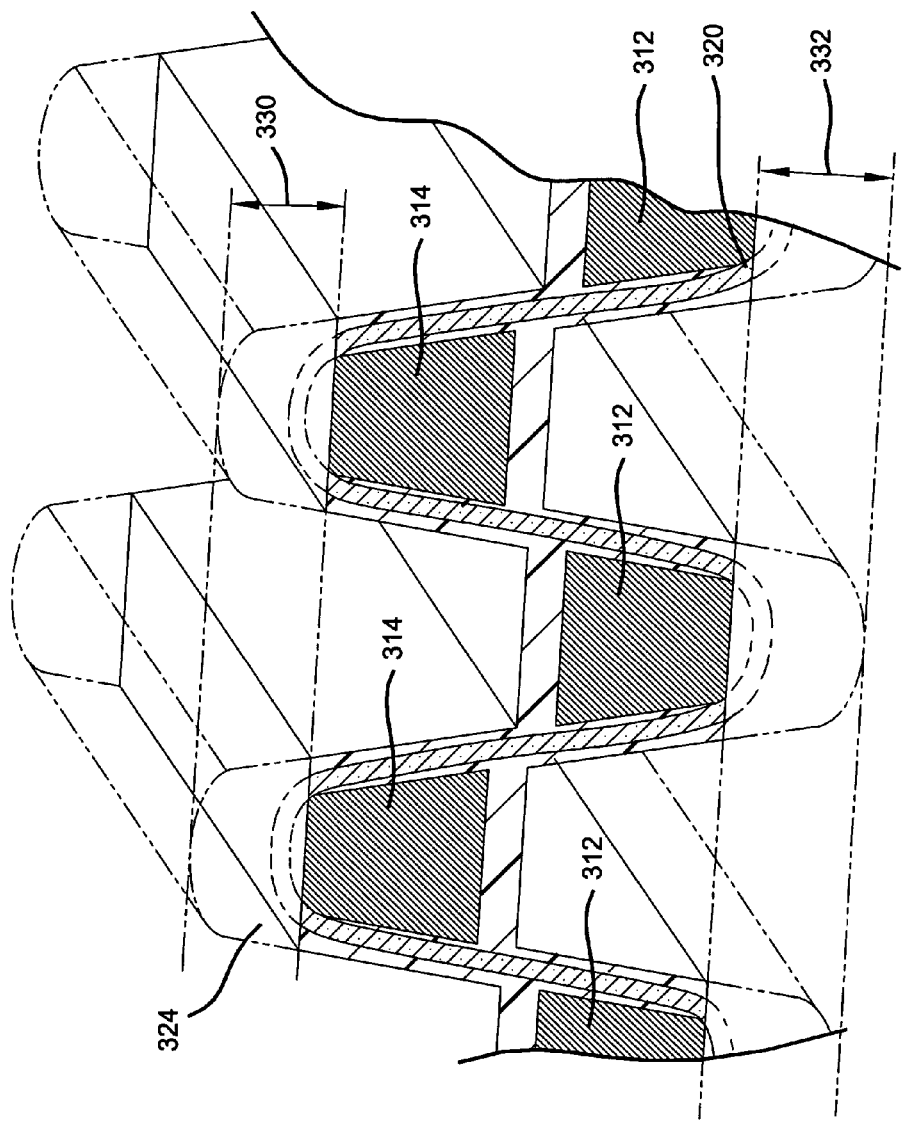
FIG. 10 is a schematic illustration of a portion of the composite separator plate at block 308 of FIG. 7 of the preferred manufacturing process.

The steps of fabricating a composite separator plate in accordance with the present invention are set forth in the flow chart generally indicated at 300 in FIG. 7 and illustrated in FIGS. 8-10. As indicated at block 302, a plurality of support members 312, 314 are initially positioned in a cavity 316 defined by mold 318 (as seen in FIG. 8). The support members 312, 314 are shown in FIGS. 8-10 as elongated members having an arched cross section. A skilled practitioner will appreciate that the support members 312, 314 may be any of a variety of cross sectional shapes. For example, the support members 312, 314 may be square, triangle, rectangle or trapezoidal shaped to correspond to the shape of the lands. Likewise, the support members may be solid in cross-section as shown in FIGS. 8-10 or tubular as shown in FIG. 2-6.

The support members 312, 314 are aligned in a generally parallel configuration but may be aligned in a variety of configurations depending on the size and shape of the composite separator plate to be formed. The support members 312, 314 are respectively located above and below a median plane P. Specifically, the support members 312, 314 are positioned so that the support members 312 located below the median plane P are spaced apart from the support members 314 located above the median plane P. For the purpose of clarity, the support members 312, 314 are shown without a supporting or aligning device. However, it is generally understood that the mold 318 or some associated device aligns and retains the support members 312, 314 to achieve consistent and desired alignment thereof.

Next, a plurality of continuous fibers 320 are woven around the support members 312, 314 whereby each fiber 320 is supported by the support member 312, 314 to form a lattice structure 322 as indicated at block 304 of FIG. 7. The continuous fibers 320 as shown in FIG. 8 are routed in a generally sinusoidal pattern to optimize the orientation of the continuous fibers 320 in a through plane direction for effective electrical conductivity through the plate. The continuous fibers 320 are preferably arranged along the longitudinal axis of the support members 312, 314 to provide an even distribution of contact elements. The continuous fibers 320 are shown without any fixtures for the purpose of clarity. However, it is readily understood that the continuous fibers 320 may require a device to align or retain the fibers in the desired position.

After the lattice 322 is formed, it is prepared for in-situ molding with a polymeric body portion 324 as indicated at block 306 of FIG. 7. The body portion 324 of the plate separator encases the support members 312, 314 and the continuous fibers 320. FIG. 9 shows the lattice structure 322 in an injection type polymer molding process. During the injection molding process, the lattice 322 is placed in the die cavity 316 of the injection mold 318. The die cavity 316 (as shown in FIG. 8) includes a first molding surface 326 and a second molding surface 328 formed therein. The first molding surface 326 has a plurality of grooves formed therein to form a plurality of complimentary lands in separator plate. Likewise, the second molding surface 328 has a plurality of grooves formed therein defining a plurality of complimentary land. In this manner, molding surfaces 326, 328 forms molded flow fields in the upper and lower surfaces of the composite separator plate as illustrated in FIG. 10. Once the lattice 322 is properly situated in the mold cavity 316, conventional injection molding techniques can be used to fabricate the separator plate.

The geometry of the molding surfaces 326, 328 and hence the geometry of the lands play an important part in the orientation of the continuous fibers 320. While many parameters may be used to define plate geometry such as groove length, land length, and groove depth, an extra land height extending beyond the support members 312, 314 promotes the orientation of the continuous fibers 320 in a through plane orientation. In this regard, an arched cross section, as shown in FIGS. 8-10, and in particular the rounded top portion forces the continuous fibers 210 into the groves in the molding surfaces 326, 328. Thus, the molding surfaces 326, 328 are configured to form land extensions 330, 332 having a portion of the continuous fiber 320 therein. As presently preferred, extra land height is within the range of 10% to 50% of the thickness of the desired separator plate. For example, extra land height would be approximately 0.2-1.0 millimeters for a separator plate having a thickness of 2.0 millimeters.

After forming and cooling, the separator plate 334 is removed from the mold 318 and prepared for machining. In the machining step indicated at block 308 of FIG. 7, the land extensions 330, 332 are removed to reduce the thickness of plate 334 and to sever a portion of the continuous fibers 320. Removal of the land extensions 330, 332 reduces the land height and forms an exposed surface. Once the land extensions 330, 332 are removed, the fiber ends are exposed. Thus, severing the continuous fibers 320 creates an end which terminates at these exposed surfaces which provides good electrical and thermal contact with the primary collector.

Because of the orientation of the continuous fibers 320 in lattice 322, the conductive elements formed by severing the continuous fibers 320 are aligned in the desired through plane configuration. The machining operation to remove the land extensions 330, 332 can be performed by any suitable machining method depending on the particular composite material and the mechanical properties thereof. In this regard, preferred machining methods includes laser machining, water jet machining, milling, fly cutting and sanding. The machining operation has the added benefit of removing the polymer skin which may have formed during the molding operation. Upon completion of the machining operation, a finished product is formed. Through this machine operation, better control over the geometric dimensions of the separator plate is further obtained.

As described above, the molding process is used to form the lands and channels of the separator plate. The machining process illustrated at block 308 may also include machining of the lands and channels to achieve the proper geometric dimension of the flow field. Alternatively, the mold may be configured to form a generally planar blank which is subsequently machined to form the desired flow fields. Such alternate means of fabricating the flow fields are within the scope of the present invention.

Typically, the geometry of the molded flow field pattern in the separator plate can significantly affect the orientation, and hence the thermal and electrical conductivity thereof. For example, as disclosed in U.S. Ser. No. 09/871,189 entitled "Fuel Cell Separator Plate Having Controlled Fiber Orientation And Method Of Manufacture" filed on May 31, 2001, which is herein expressly incorporated by reference, plate designs employing discrete fibers (i.e., fibers which do not extend continuously through the separator plate) favors more a narrow flow field groove width as well as a wider land width to achieve through plane orientation of the discrete fibers. However, the manufacturing process of the present invention minimize the sensitivity of the fiber orientation to the flow field geometry, in addition to providing a continuous electrical path through the plate which is in good electrical and thermal contact with the primary collector. Furthermore, the present invention provides flexibility in the geometry of the flow fields. While the preferred embodiments disclosed herein include a separator plate having generally parallel support members and generally parallel flow channels, the present invention is readily adaptable to plate designs having more complex geometries, limited only by the ability to wrap support members with conductive fibers. A skilled practitioner will also note that the staggered or off set geometry (i.e. upper land area above lower channel groove) enable the use of continuous fibers.

In the foregoing discussion of the preferred manufacturing process, an injection type molding has been referenced and more particularly to a die cavity capable of forming a separator plate having certain land extension details on the upper and lower surfaces. However, one skilled in the art will readily recognize that other conventional forming processes such as compression molding or injection compression molding may be utilized to form a separator plate having such land extension features. As such, the present invention is not limited to the injection molding technique described herein but encompasses other suitable molding processes.

After machining, a highly conductive layer may be disposed along the planar surface of the lands as indicated at block 310 of FIG. 7. The highly conductive layer is formed on the separator plate after the upper and lower extensions 330, 332 have been removed. The highly conductive layer as described in reference to FIG. 4 is formed on the exposed surfaces by adhering a sufficient quantity of electrically conductive particles thereto. The electrically conductive particles may be adhered to the exposed surfaces by vapor deposition (PVD or CVD) spraying, brushing, sifting, fluidized bed immersion or the like. It is also contemplated that the highly conductive layer may be formed on the exposed top surfaces by impingement or simply stuck to the surface while the polymeric material is in a tacky state.

The separator plate of the present invention may also include an additional step to manufacture a separator plate with voids or passageways (as described in reference to FIG. 5) instead of conductive elongated support members disposed therein. In this method, support members formed of polystyrene, aluminum or alumina are used in the step indicated at block 302 of FIG. 7. After removing the land extensions, the support members are dissolved using a suitable solvent such as acetone or NaOH. Once the tubes are dissolved, the passageways remain in the main body portion and are adaptable for coupling to a coolant fluid to control the thermal energy within the separator plate. The transfer of thermal energy is enhanced because the fibers conduct thermal energy directly to the coolant.

The above description of the preferred embodiments of the present invention are merely exemplary in nature and, thus, variations that do not depart from the gist of the invention are intended to be within the scope of the invention. Such variations are not to be regarded as a departure from the spirit and scope of the invention.

What is claimed is:

1. A composite separator plate for a fuel cell comprising a body portion having a first surface with at least one flow channel formed therein, a second surface opposite said first surface, said body portion having a passageway formed through said plate between said first surface and said second surface which defines a fluid flow path that is parallel to said first and second surfaces but not in communication with said at least one flow channel, said body portion further including a plurality of electrically conductive elements, each of said plurality of electrically conductive elements having a first end terminating at said first surface and a second end terminating at said second surface such that said element extends continuously through said body in a through plane direction.

2. The composite separator plate of claim 1 wherein said body portion further comprises a polymeric material.

3. The composite separator plate of claim 2 wherein said polymeric material is a thermally conductive polymeric material.

4. The composite separator plate of claim 2 wherein said polymeric material is selected from the group consisting of thermoset polymers and thermoplastic polymers.

5. The composite separator plate of claim 4 wherein said polymeric material is selected from the group consisting of silicone, poly-isobutylene, epoxy, polyvinyl ester, polyester and phenolic.

6. The composite separator plate of claim 4 wherein said polymeric material is selected from the group consisting of polypropylene, ETFE, nylon and rubber-modified polypropylene.

7. The composite separator plate of claim 2 wherein said plurality of conductive elements are selected from the group consisting of carbon fibers, graphite fibers, Au-coated graphite fibers, Pt.-coated graphite fibers, Au fibers, Pt. fibers and stainless steel fibers.

8. The composite separator plate of claim 1 wherein said composite separator plate comprises a polymeric material of 50% to 99% by volume and conductive fibers of 1% to 50% by volume.

9. The composite separator plate of claim 1 wherein the cross-sectional area of each of said first and second ends comprise 5% to 50% of the surface area of said first and said second surfaces respectively.

10. The composite separator plate of claim 1 wherein said body portion further comprises a plurality of thermally conductive polymer particles.

11. The composite separator plate of claim 1 wherein said composite separator plate has a bulk resistivity less than 0.01 ohm·cm.

12. The composite separator plate of claim 1 wherein said composite separator plate has an area specific resistance less than 20 milliohms·cm$^2$.

13. The composite separator plate of claim 1 wherein said composite separator plate includes a layer of conductive material disposed over the first surface and in contact with said plurality of conductive elements.

14. The composite separator plate of claim 13 wherein said layer of conductive material includes at least one material selected from the group consisting of gold, platinum, carbon, palladium, rhodium and ruthenium.

15. The composite separator plate of claim 1 wherein said second surface includes a plurality of flow channels formed therein.

16. The composite separator plate of claim 1 wherein said first and second surfaces are generally laterally extending surfaces of said composite separator plate and are longitudinally spaced from one another, said passageway extending generally laterally in the longitudinal spacing between said first and second surfaces.

17. A composite separator plate for use in a fuel cell stack, the composite separator plate comprising:

a plurality of elongated support members;
a body portion formed around the support members and having a first surface with a plurality of flow channels and a second surface opposite the first surface; and
a plurality of electrically conductive fibers disposed within the body portion, each conductive fiber extending continuously from the first surface of the body portion to the second surface of the polymeric body portion in a through plane orientation.

18. The composite separator plate of claim 17 wherein a thermally conductive member is disposed between each of said flow channels formed in the first surface.

19. The composite separator plate of claim 18 wherein said support members comprise thermally conductive members.

20. The composite separator plate of claim 19 wherein said thermally conductive members are operably coupled to a thermal management system to control the temperature of said composite separator plate.

21. The composite separator plate of claim 19 wherein said thermally conductive members further comprise tubular members.

22. The composite separator plate of claim 21 further comprising a heat sink extending from said thermally conductive tubular member and terminating at said first surface.

23. The composite separator plate of claim 21 wherein said tubular member comprises at least one material selected from the group consisting of carbon-loaded polymer, stainless steel, thermally-conductive polymer, carbon, titanium.

24. The composite separator plate of claim 17 wherein said plurality of fibers are thermally conductive.

25. The composite separator plate of claim 17 wherein said composite separator plate includes a layer of conductive material disposed over said first surface and in conduct with said plurality of fibers.

26. The composite separator plate of claim 25 wherein said layer of conductive material comprises at least one material is selected from the group consisting of gold, platinum, graphite, carbon, palladium, rhodium and ruthenium.

27. The composite separator plate of claim 17 wherein said second surface includes a plurality of flow channels formed therein.

* * * * *